(12) United States Patent
Lonsing (10) Patent No.: US 7,750,926 B2
(45) Date of Patent: *Jul. 6, 2010

(54) METHOD AND APPARATUS FOR PRODUCING COMPOSITE IMAGES WHICH CONTAIN VIRTUAL OBJECTS

(76) Inventor: Werner Gerhard Lonsing, Rotgenstrabe 20/24, Bonn (DE) 53177

( * ) Notice: Subject to any disclaimer, the term of this patent is extended or adjusted under 35 U.S.C. 154(b) by 0 days.

This patent is subject to a terminal disclaimer.

(21) Appl. No.: 12/127,519

(22) Filed: May 27, 2008

(65) Prior Publication Data

US 2009/0051682 A1 Feb. 26, 2009

Related U.S. Application Data

(63) Continuation of application No. 10/641,156, filed on Aug. 15, 2003, now Pat. No. 7,391,424.

(51) Int. Cl.
G09G 5/00 (2006.01)

(52) U.S. Cl. ...................................... 345/633
(58) Field of Classification Search .......... 345/629–641
See application file for complete search history.

(56) References Cited

U.S. PATENT DOCUMENTS

| | | | | |
|---|---|---|---|---|
| 5,515,485 A * | 5/1996 | Luquet et al. | ................ | 345/632 |
| 5,625,765 A * | 4/1997 | Ellenby et al. | ............... | 345/633 |
| 5,682,332 A * | 10/1997 | Ellenby et al. | .............. | 702/150 |
| 6,064,398 A * | 5/2000 | Ellenby et al. | .............. | 345/633 |
| 6,166,744 A * | 12/2000 | Jaszlics et al. | .............. | 345/629 |
| 6,330,356 B1 * | 12/2001 | Sundareswaran et al. | ... | 382/154 |
| 6,373,508 B1 * | 4/2002 | Moengen | ..................... | 715/848 |
| 6,430,416 B1 * | 8/2002 | Loomis | ................... | 455/456.1 |
| 6,570,581 B1 * | 5/2003 | Smith | .......................... | 345/632 |
| 6,628,298 B1 * | 9/2003 | Debevec | ..................... | 345/632 |
| 6,937,255 B2 * | 8/2005 | Fukuda et al. | .............. | 345/633 |
| 2002/0070952 A1 * | 6/2002 | Hoch | .......................... | 345/647 |
| 2002/0094189 A1 * | 7/2002 | Navab et al. | ..................... | 386/4 |
| 2003/0080978 A1 * | 5/2003 | Navab et al. | ................. | 345/633 |
| 2003/0202158 A1 * | 10/2003 | Fukaya et al. | .................. | 353/25 |
| 2003/0227542 A1 * | 12/2003 | Zhang et al. | ................... | 348/61 |
| 2004/0041822 A1 * | 3/2004 | Iizuka et al. | ................. | 345/634 |
| 2004/0113885 A1 * | 6/2004 | Genc et al. | .................. | 345/156 |
| 2004/0131232 A1 * | 7/2004 | Meisner et al. | ............. | 382/103 |

* cited by examiner

Primary Examiner—Ryan R Yang
(74) Attorney, Agent, or Firm—Matthew A. Pequignot; Pequignot + Myers LLC (57) ABSTRACT

Methods and apparatus for production of composite images, videos, or films which exhibit virtual objects. More particularly, methods and apparatus for rendering, scaling, and/or locating, virtual objects within composite images, videos, or films employing marker objects as reference objects.

23 Claims, 5 Drawing Sheets principal functionality

METHOD AND APPARATUS FOR PRODUCING COMPOSITE IMAGES WHICH CONTAIN VIRTUAL OBJECTS

FIELD OF THE INVENTION

This invention relates to the production of composite images, videos, or films which exhibit virtual objects. More particularly, this invention relates to methods and apparatus for rendering, scaling, and/or locating virtual objects within composite images, videos, or films employing marker objects as reference objects.

BACKGROUND OF THE INVENTION

The use of representative models (typically less than full-scale), both real and computer generated, has heretofore been important to various commercial industries. For example, small-scale physical models (e.g. constructed from wood) have been prolifically employed in the construction/architecture industry in order so that proposed building designs can be viewed and evaluated for aesthetics, etc. prior to incurring the expense of commencing or completing construction. Also, computer generated images (hereinafter CGI's) have been employed for similar purposes and provide certain advantages in that CGI's are easily duplicated and can be transmitted electronically to distant locations virtually instantly (as compared to the cumbersome process of packing a fragile wooden model and shipping it via ground or air freight).

Similarly, the use of special effects in both the movie and television industries is becoming increasingly common. In a typical movie or television program which employs special effects, a real scene might be augmented with CGI's. For example, a computer generated character or fictitious animal might be inserted into a previously filmed location shot. Conversely, in science fiction movies for example, entire scenes can be generated by computer with either real or computer generated characters existing in the scene.

Certain drawbacks exist with respect to the above technologies, however, and improvements which address these drawbacks are desired. For example, the detail engineered or crafted into a physical model is time demanding and labor intensive. Similarly, changes to the design or appearance of a physical model often require expenditures of time and resources nearly equal to that of building the original model itself. Furthermore, it is difficult to envision the full aesthetic nature of a project if built only on a small scale and with non-realistic building materials (e.g. with wood, plaster, or paper) and not the actual building materials which are desired (e.g. glass, concrete, steel, etc. including their associated colors, textures, reflectivity, etc.). Still furthermore, construction of models approaching 1:1 scale is expensive and typically impractical except for in some industries (e.g. the movie industry).

In addition to problems with physical models, the use of computer technologies related to CGI's presents various additional drawbacks. For example, in some applications, it is desired that a CGI be precisely sized and located relative to the scene (or object within the scene) in which it appears. Existing technologies do not adequately address these problems of scale and positioning. Furthermore, in outdoor environments, weather/lighting conditions change continuously and therefore affect the appearance of imaged/filmed scenes. In order to maintain an adequate degree of realism, the appearance of a CGI ("virtual object") inserted into a scene should be modified accordingly (to reflect the lighting and/or appearance of its "live" surroundings). Current technologies do not sufficiently resolve this problem.

In view of the above, it is apparent that there exists a need in the art for methods and apparatus which overcome one or more of the above drawbacks. It is a purpose of this invention to fulfill these needs in the art, as well as other needs which will become apparent to the skilled artisan once given the following disclosure.

SUMMARY OF THE INVENTION

Generally speaking, this invention fulfills the above-enumerated problems in the art by providing:

a method of rendering a composite image including at least a virtual object displayed in a real scene image, the method comprising:

determining size and shape qualities of a marker object;

locating the marker object at a location at or near a location at which a virtual object is desired to be virtually placed;

determining a position of the marker object;

employing an image capturing means to capture at least one image of a real scene containing the marker object;

determining a position of the image capturing means when the at least one image of a real scene is captured;

analyzing the image of a real scene to detect the marker object;

rendering a virtual object by synchronizing a virtual camera with the image capturing means, synthesizing a canvas having a size and shape corresponding to a size and shape of the image of a real scene, and projecting the virtual object onto the canvas so that the virtual object is displayed on the canvas at an orientation determined with reference to the position of the marker object in the image of a real scene;

composing a composite image comprising the image of a real scene and the virtual object.

In alternative embodiments, therein is provided:

apparatus for rendering a composite image including at least a virtual object displayed in a real scene image, the apparatus comprising:

a marker object of known size and shape and located at known coordinates;

an image capturing means located at known coordinates;

a computer in communication with the image capturing means, and tangibly embodying a program of instructions executable by the computer to perform steps comprising:

detecting the marker object when displayed in an image captured by the image capturing means;

rendering a virtual object by synchronizing a virtual camera with the image capturing means, synthesizing a canvas having a size and shape corresponding to a size and shape of the image of a real scene, and projecting the virtual object onto the canvas so that the virtual object is displayed on the canvas at an orientation determined with reference to the position of the marker object in the image of a real scene;

composing a composite image comprising a combination of the virtual object and a real scene image captured by the image capturing means.

It is an object of this invention to allow combination of real images with computer generated three-dimensional objects, preferably on-site and in real-time, so that the appearance of reality at a specific geographical location (as a captured image or images) can be augmented for various commercial and/or artistic purposes.

In some embodiments, computer generated three-dimensional objects are registered (displayed) in real scenes and can be modified (e.g. in appearance, size, shape, color, texture) on location.

In further embodiments of this invention, lighting and/or weather conditions are detected by a computer from a recorded image and the appearance of the computer generated three-dimensional object is modified to reflect such conditions.

DETAILED DESCRIPTION OF CERTAIN EMBODIMENTS

For a more complete understanding of the present invention and advantages thereof, reference is now made to the following description of various illustrative and non-limiting embodiments thereof, taken in conjunction with the accompanying drawings in which like reference numbers indicate like features.

Figure 1:
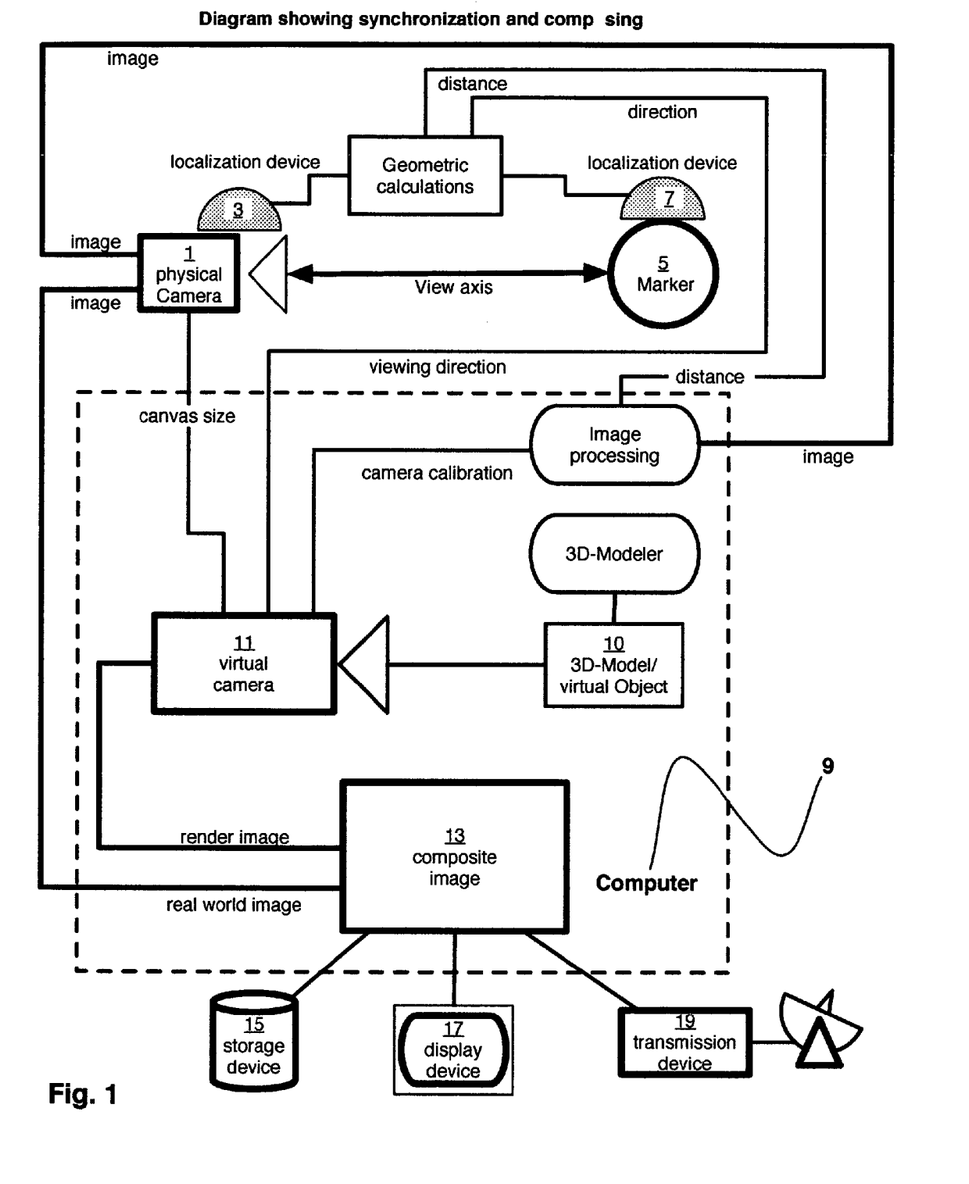
FIG. 1 illustrates a graphical representation of one embodiment of the composite image generation apparatus and method according to the subject invention.
Figure 2:
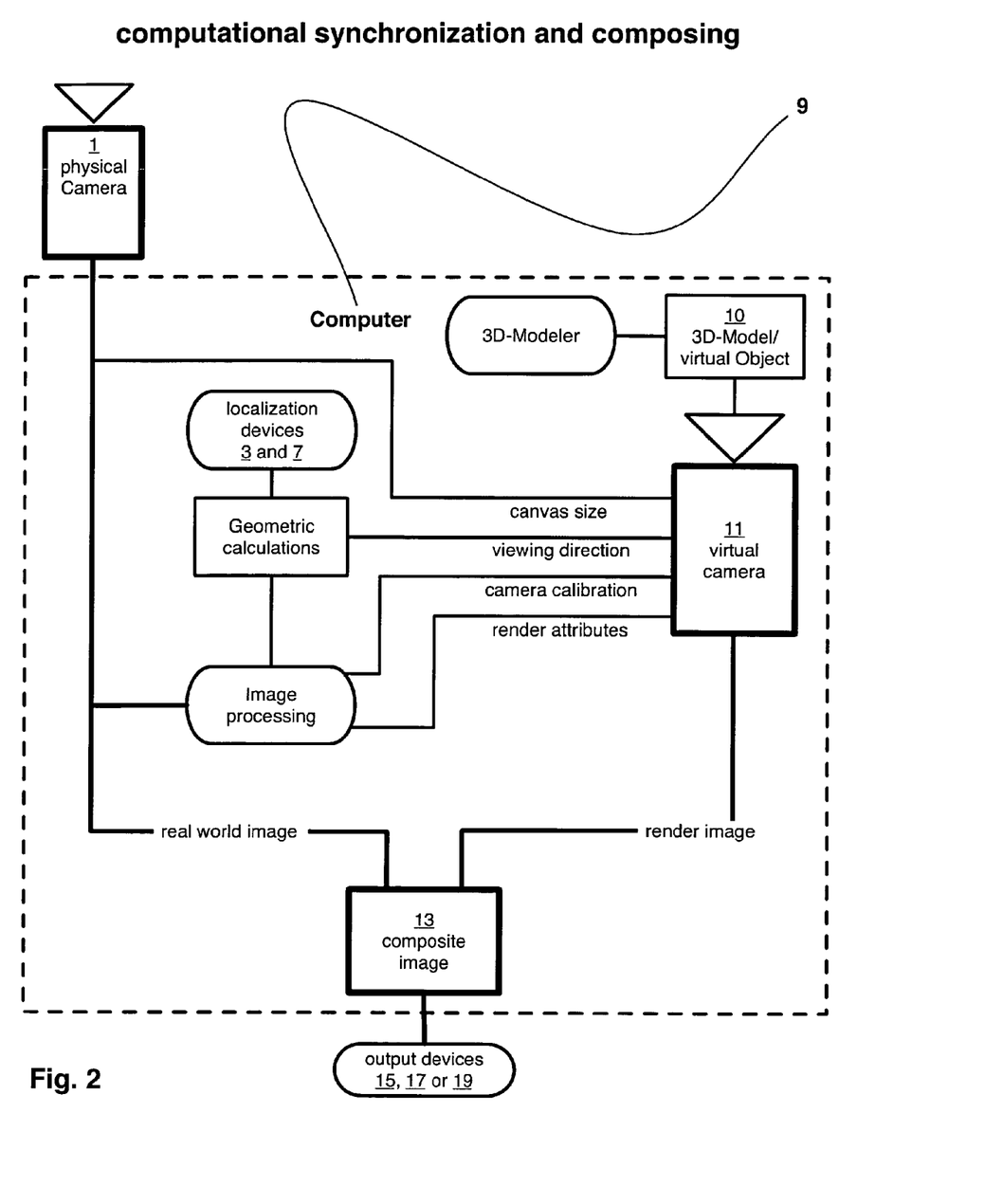
FIG. 2 illustrates a simplified diagram of the functionality of the apparatus and method according to FIG. 1.
Figure 3:
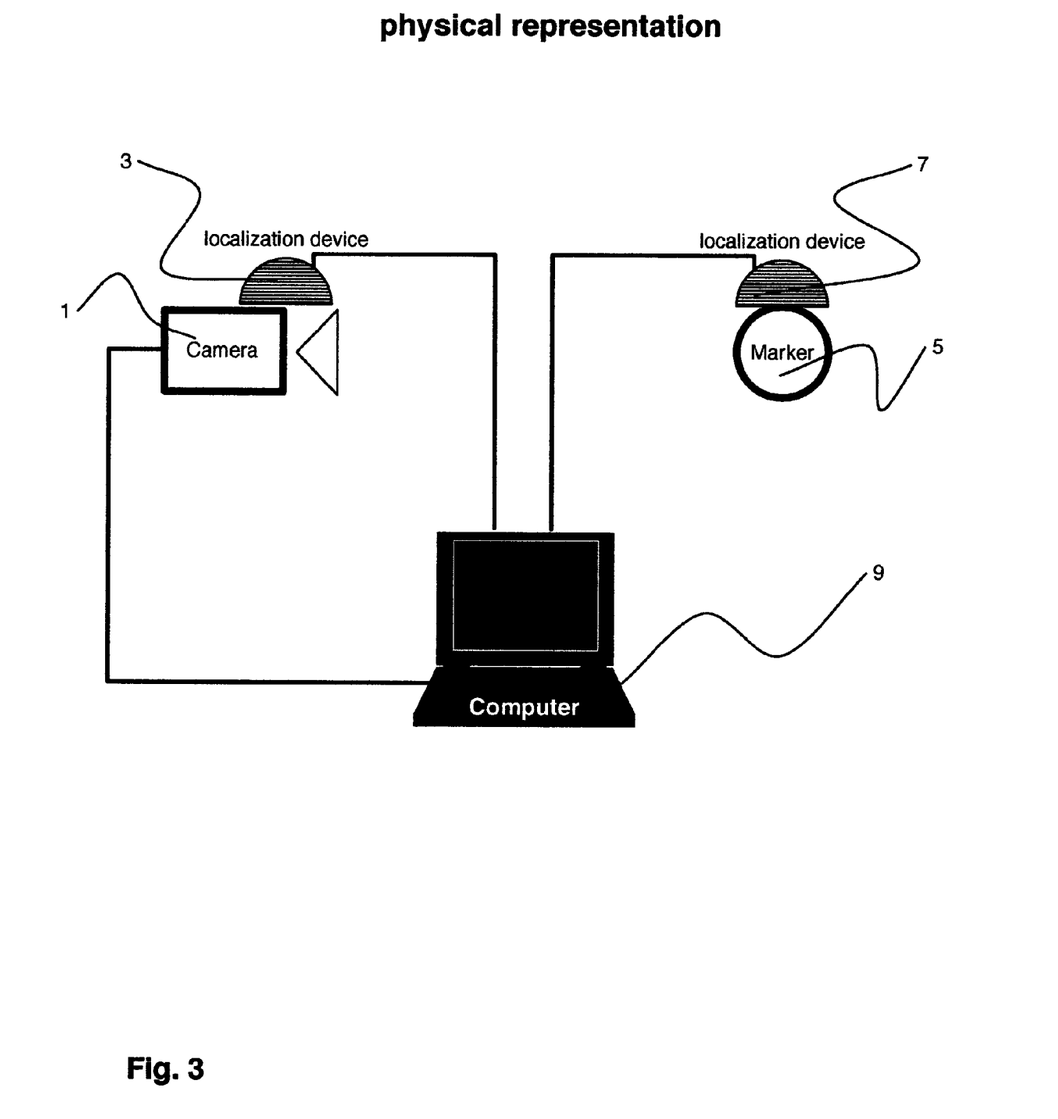
FIG. 3 illustrates the physical elements of the embodiment of the invention according to FIG. 1.

Referring initially to FIGS. 1-3, a graphical representation of one embodiment of the subject invention is illustrated therein. As such, FIGS. 1-3 illustrate apparatus as well as method steps for producing a composite image comprised of a combination of a virtual object and a real scene image. In this regard, the image generation apparatus according to the subject invention, generally includes a camera 1 (e.g. digital or film) capable of capturing either still or moving images and a position determining means 3 (e.g. a GPS, alternative forms of triangulation, radar, sonar, a laser range finder, surveying equipment, etc.) located on camera 1. In addition, a marker object 5 is provided which, as will be described in detail below, is employed for establishing a reference position from which a location of a virtual object will be assigned. For this purpose, it is preferred that the precise shape and dimensions of marker object 5 be known and stored in a memory, for example.

In the steps of producing a composite image according to the subject invention, the position of marker object 5, once it is placed at or near the location at which a virtual object is desired to be displayed, is determined. In this regard, the position of marker object 5 can be determined manually, but is preferably determined via position determining means 7 (e.g. GPS device) located on the marker object. In addition, at least one computer 9 (having a memory device) is provided to execute various functions (which will be described below) as well as to store various fixed and collected data.

In order so that position determining means 3 and 7 and camera 1 can communicate with computer 9, a wireless local area network (WLAN)(not shown) is provided by which the various parts of the invention can communicate by radio waves. In less preferred embodiments, other forms of wireless communication or hard-wiring for data transmission can, of course, be used.

In order to perform various tasks related to the invention, computer 9 contains program code in its memory for executing various tasks including methods of image processing. By way of non-limiting example, in one embodiment, the program code (software) stored in memory is capable of detecting marker object 5 in an image captured by camera 1 (e.g. via thresholding, color detection, or any other detection method). In alternative embodiments, resident software is capable of determining size and shape values of objects in an image captured by camera 1, and is capable of comparing the size and shape values of the objects to the known size and shape of marker object 5 so that marker object 5 can be detected in the captured image. For this purpose, the canvas size (image size i.e. width and height in number of pixels) of the camera should be known, so that the scale and thus the size of the marker object in the image can be determined.

Furthermore, in at least one embodiment, computer 9 contains software for generating a virtual object (for generating it on site). In such an embodiment, commercially available software such as CAD-type software may be used. In alternative embodiments, however, the virtual object can be generated by a separate source (e.g. a second computer) as required. Or, the virtual object can simply be resident in computer 9's memory (having been created independently elsewhere) or be received wirelessly (e.g. by satellite or antenna).

The computer, of course, should contain interfaces for at least the input of video signals and the input of position determination means data (e.g. IE 1394 or USB ports).

In further preferred embodiments, computer 9 employs a virtual camera 11 (e.g. generated by a software or program code component such as OpenGl™ or Renderman™) which is capable of rendering two-dimensional images from three-dimensional virtual objects for use in composing composite images (comprising a combination of a virtual object and a real scene image captured by camera 1). Details regarding the operation of the virtual camera will be discussed at length below. Generally speaking, however, once a composite image (or images) is generated, the composite image(s) can be displayed on display device 17 (e.g. a closed circuit monitor, LCD screen, etc.) so that the image can be reviewed (e.g. such as so a director can view a filmed scene on location and re-shoot if necessary). Alternatively, the image can be stored in storage device 15 (a conventional memory device) or simply stored in the memory of computer 9. Further alternatively, composite image(s) can be transmitted via conventional transmission device 19 to a remote location (e.g. to a television studio for broadcasting via antenna or via satellite or to a remote storage location).

In order to render two-dimensional images from three-dimensional objects as well as produce composite images using the rendered two-dimensional images according to the methods/apparatus of the present invention, various initial steps must first be taken. In this regard, as an initial matter, the geographical site for image capture must first be selected. In an architectural or construction type example, the site which is selected would likely be the site where a real building is desired to be constructed. Conversely, it may be desired to view a virtual building at several geographical sites, so that the most desirable land can be selected for a particular construction project (e.g. prior to purchase and/or groundbreaking). Similarly, if the instant invention is being employed in the production of a television program or movie, the site which is chosen would be a site at which an event or scene from a script is desired to be filmed. In yet another example, it may be desirable to display alternate highway or railroad routes at public hearings. In such case, various prospective locations or various views of a single location can be filmed so that the impact of the selection of a particular highway or railroad route can be viewed with some degree of realism (e.g.

a highway can be shown "virtually" at a hearing to traverse, alternately, both the north and south side of a mountain for comparative purposes).

Figure 4A:
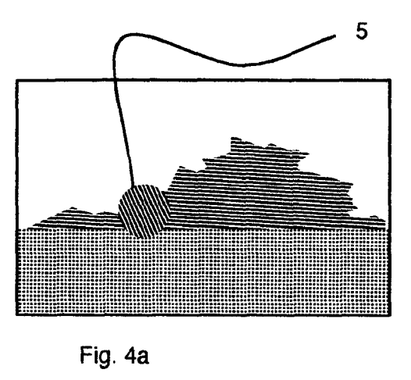
FIGS. 4a-4d demonstrate marker object selection factors according to one embodiment of the subject invention.
Figure 4B:
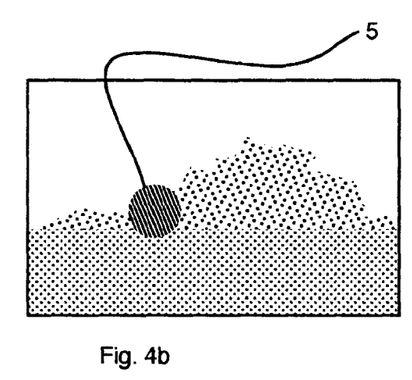
Figure 4C:
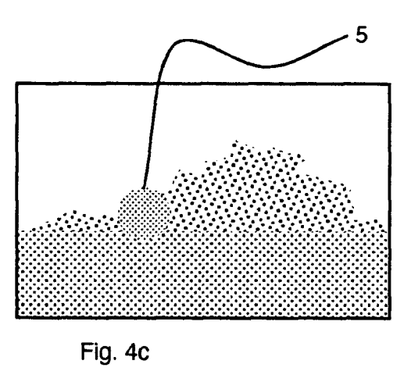
Figure 4D:
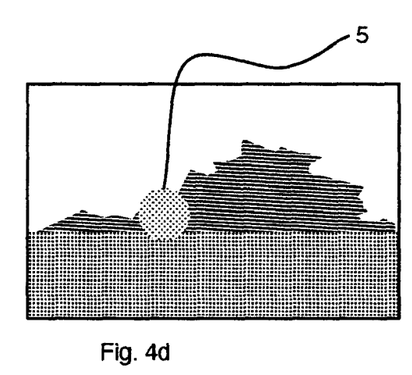

Once the geographical site is selected, a precise "target" position (at the geographical location) at which a virtual object is desired to be displayed must be chosen. Furthermore, characteristics of the chosen geographical site should be observed, and a marker object appropriate for such location selected. In this regard, for the purpose of facilitating detection of the marker object, it is preferred that the object have a uniform geometric shape (e.g. a sphere, square, or triangle) and that the object have a coloration and/or texture which is as distinct as possible from the surroundings/scene that it will be placed in. For example, if the predominant coloration of a location is green (e.g. a grassy field), it would be less desirable to select a green marker object than it would be to select a red one (the objective being, of course, for marker object 5 to contrast well with its surroundings for ease of detection). Similarly, if the marker object is placed in a scene overlooking a city exhibiting various square or rectangular-type shapes (buildings, windows, etc.), it would be more advantageous to select a spherical marker object than it would be to select a cubic or rectangular one. The skin or texture of the marker object should be selected with similar factors taken into account. FIGS. 4a-4d illustrate these general principals with regards at least to the contrast of marker object 5 with respect to it surroundings in a given scene. As will be noted from FIGS. 4a and 4b, a darkly colored marker object is difficult to detect against a dark background (FIG. 4a), but is easy to detect against a light background (FIG. 4b). The converse effect may seen in FIGS. 4c and 4d.

Similarly, if more than one marker object is used (e.g. such as if the position of the camera has to be computed directly from known marker positions), the appearances of the different marker objects must be distinct, either in shape or surface, so that they can be detected individually.

As an additional marker object selection guideline, it is noted that it is typically desirable for the marker object to be as large as is practically possible. In this regard, employing a large-type marker object makes the detection and data collection steps easier and less error prone (i.e. extrapolation errors are minimized as the marker object gets larger). It is contemplated, however, that marker objects as small as ping pong balls (or smaller) can be used with success and the use of objects of that size may be desirable in some circumstances (e.g. in the foreground if the location of the target position is inaccessible or remote).

Although the above guidelines for choosing a marker object have been provided to satisfy the "best mode" requirements of the patent laws, it is noted that many other appearances, sizes, and shapes of marker objects can be successfully employed. The above guidelines have simply been provided so that computer 9, employing its software, can most readily detect the marker object.

Figure 5:
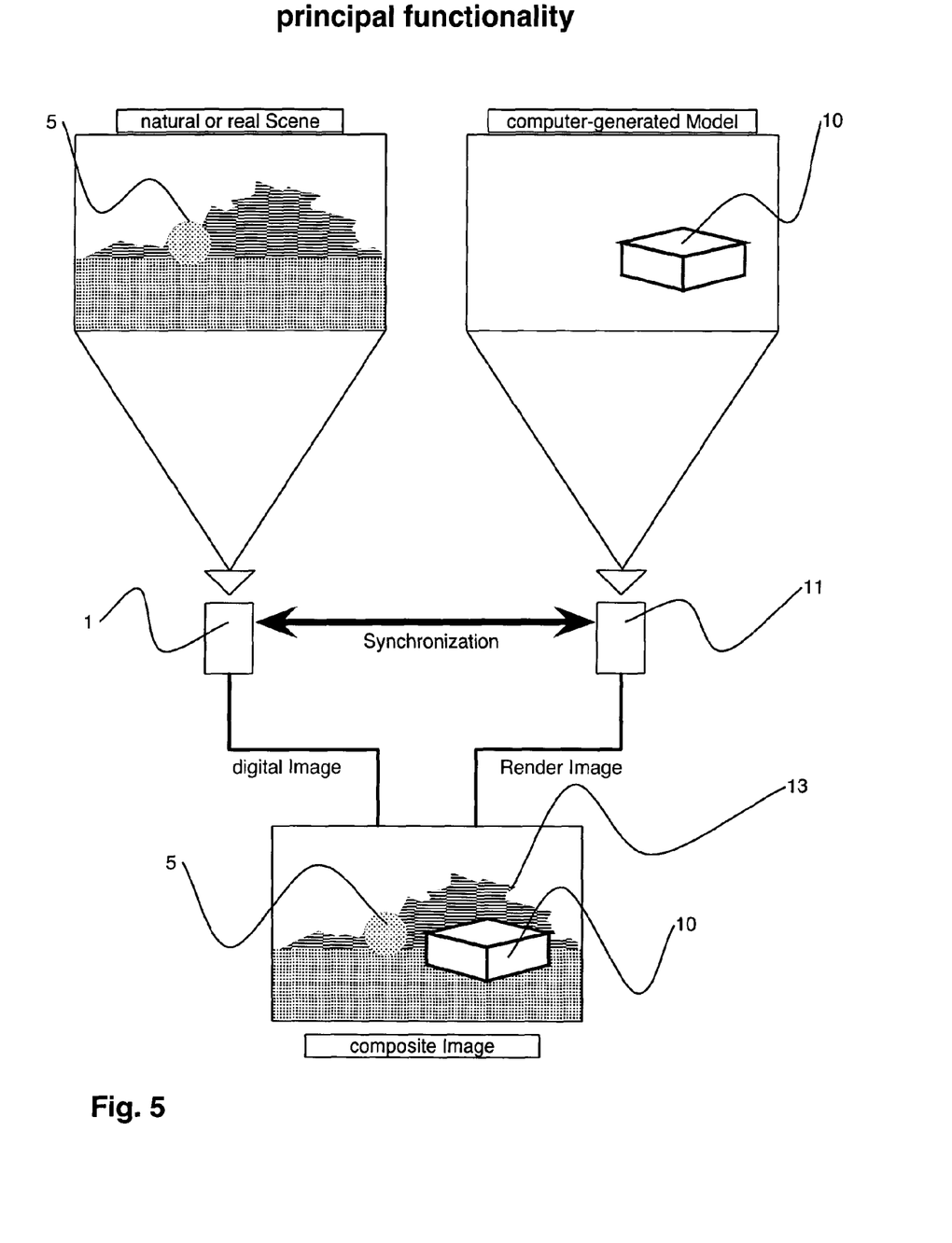
FIG. 5 is a graphical representation of the image composition stage according to the embodiment of the invention illustrated in FIGS. 1 and/or 2.

Referring now to FIGS. 3 and 5, once the marker object appearance is chosen and the target position for the marker object is selected, marker object 5 is placed at the target location and the precise position of marker object 5 is determined. As aforesaid, this position determination may be made manually or with position determining means 7. Although position determining means 7 is preferably a GPS-type unit (i.e. because they are inexpensive, sufficiently accurate, usable universally geographically), various other mechanisms may be employed such as alternative forms of triangulation, radar, sonar, a laser range finder, surveying equipment, etc. It is noted, that current GPS systems are subject to random data errors or data aberrations (conventionally+/−3 meters). However, employing apparatus and methods according to the subject invention described herein, such errors are overcome and are not of sufficient magnitude to prevent successful image composition (i.e. a possible position error of 3 meters at a distance of 100 meters allows an error tolerance of 3%). Furthermore, more precise location determination means are available, and superior devices will likely be created in the future.

In alternative embodiments, the position of marker object 5 can be automatically determined at the instant at which camera 1 captures an image (i.e. position determining means 7 can be programmed to record position information e.g. with a timestamp when camera 1 is triggered).

After marker object 5 has been placed at the target location, and the position of marker object 5 has been determined, camera 1 (see FIG. 3) is used to compose and capture an image or series of images (e.g. still or moving, digital or film) of a scene containing marker object 5 (see FIG. 5, which illustrates marker object 5 placed in a natural scene). Images are, of course, composed according to the commercial or artistic purpose of the desired final composite image(s). If it is desired that the virtual object be animated or that the virtual object appear at multiple target positions within a scene, object 5 is simply moved or repositioned and subsequent position determinations (with position determination means 7) made as each image or series of images are taken.

As an image is taken, it is digitized or scanned in order to allow computational calculations. Therefore, information about the digital image is produced by the image capturing device and transmitted or stored in an image file format (such as TIFF, JPEG™ or specific information in individual movie frames). This information is determined through camera 1 (e.g. logical size in width and height defined in pixel, the amount of information in bits each pixel has e.g. color depth, transparency, 24-bit RGB or 48-bit RGBA, etc.) and is transferred to computer 9. In addition, digital image file formats provide information about the order of pixels (most importantly the starting point and scanning direction), which is used during subsequent image processing calculations. It is noted that if a film-type image (or images) is taken, the image must be scanned with a conventional scanner (not shown) in order to produce a digitized image and entered into computer 9.

As each image is taken, the position of the camera is measured and/or calculated and then stored in association with its respective image(s). Although the position of camera 1 can be determined manually (e.g. with sophisticated maps or by triangulation from three, known position marker objects), it is preferred that position determination means 3 be used (e.g. GPS, alternative triangulation means, radar, sonar, a laser range finder, surveying equipment, etc.). A particularly useful device for this purpose is a Bluetooth™-GPS device like the Fortuna Bluetooth GPSmart™ (hard wiring the localization device can result in reduced costs and higher speed and accuracy, however). If camera 1 is communicably connected to computer 9, images as well as positional information can be transmitted to and stored in computer 9's memory as each image and/or position determination is recorded i.e. in real-time.

Once at least one image containing marker object 5 (as well as other desired natural or man made features) has been captured and the image and target position information has been transferred to computer 9 (e.g. via WLAN or IE 1394), data processing and the rendering of virtual object 10 can occur. Although virtual object 10 may be generated prior to image capture (e.g. via computer 9, or any other computer with conventional 3-D generation software such as CAD-type software, etc.), it is also possible to generate virtual object 10 on site, or to "receive" the virtual object by transmission (e.g. from a television studio transmission by antenna or by satellite). It is further noted that this step can be performed in an order different than the order described herein and that such order can be selected according to various needs which will be determined by the user as desired.

In the next step, program code (software) is operated on computer 9 to "detect" marker object 5 on the captured two-dimensional image using methods of image processing. Although no precise method or software for detecting the image is required, certain known qualities of the marker object (previously recorded and stored in computer 9) can be "searched" for by the software employed. For example, in order to detect these qualities, color thresholding and contour-detection can be used. Because the marker objects and scenes are highly variant, all or only a few qualities of marker object 5 may be recorded and used (e.g. size, shape, and skin texture, etc.).

Once marker object 5 has been detected, computer 9 (via its software) determines the position of marker point "MP" on marker object 5. Although marker point "MP" may be any point on marker object 5 which is desired, it is typically convenient and efficient to select a easily identifiable marker point such as the center point of the marker object (particularly if such object is a sphere). Alternatively, marker point "MP" may be the corner of a cube for example. Using the center point of a sphere, however (see FIG. 5), because the position and size (i.e. diameter) of marker object 5 is known (and has been pre-input into computer 9), the precise position of the marker point can be determined with relative ease (within certain degrees of error depending on the integrity of the acquired positional data). In image rendering, marker point "MP" is the value which is used as a reference position to determine the position in the image at which virtual object 10 will be oriented. It is noted in this regard, that virtual object 10 can be displayed at this reference position "MP", or at a position distant from it. However, marker point "MP" is the reference position from which the final position of virtual object 10 should be calculated/determined.

Furthermore, if desired, appearance qualities of marker object 5 (as it appears in the captured image) can be detected and compared to reference values (color, texture, or shading) related to the appearance of the marker object stored in computer 9. If any differences are detected (e.g. due to lighting conditions, etc.), data regarding these differences is stored and can be employed during the rendering of the virtual object to provide an additional degree of realism to the final composite image.

Referring still to FIG. 5, once scale and marker point "MP" position information have been determined, if virtual object 10 has been defined, in the next step, an image can be created by viewing this object. By way of non-limiting example, then, virtual object 10 begins as data representing a three-dimensional object created according to pre-selected criteria. For example, if an architect is desirous of displaying a digital rendering of a particular building design, data representing virtual object 10 will be generated according to specifications for the envisioned building. Similarly, if a movie director wishes to render a fictitious character, a specialist programmer will generate data representing the appearance of the character according to the director's specifications (e.g. from a storyboard or other drawing). Data related to the virtual object may stored on computer 9 (e.g. having been created thereon with CAD software) or may be imported from another source (e.g. from another computer or storage media on site) and input therein. It is further noted that in preferred embodiments, virtual object 10 is editable and can be modified in all dimensions and qualities (e.g. size, color, etc.). In still further preferred embodiments, virtual object 10 is editable on location and/or in real-time (e.g. employing accelerated graphics).

In order to render virtual object 10, computer 9 (see FIG. 3) employs a virtual camera 11 for projecting an image of the virtual object in two dimensions. In order to do this meaningfully, however, this computational virtual camera must be synchronized with camera 1 (see FIGS. 2 and 5). Specifically, virtual camera 11 should be positioned virtually so that at least its viewing direction (or orientation) and canvas size are synchronized with that of camera 1. In addition, camera calibration occurs and object attributes are rendered. Synchronization ensures that when virtual object 10 is rendered as a two-dimensional image (e.g. so that it can be displayed on a flat screen or monitor), the image that is produced is displayed from the perspective of camera 1 at the time of image capture.

Therefore, when synchronized, the position of camera 1 (the real camera) and virtual camera 11 are aligned at identical coordinates in the same three-dimensional coordinate system (e.g. having values such as x, y, and z). It is noted, that synchronizing coordinates implies the synchronization of different coordinate-systems (e.g. coordinates from the GPS are transformed to coordinates in the virtual model-space). The position of marker point "MP" is then synchronized in the same manner.

As a first step of camera synchronization, the canvas size which is to be rendered by the virtual camera should be matched to the "real" canvas size of the image captured by camera 1. In order to accomplish this step, computer 9 should be supplied with data regarding camera 1's canvas size. Canvas size in this sense can be defined as the logical size in width and height, defined in pixels, of the captured image. This can be easily determined using image information in the digital image (i.e. the width and height in pixels) or is known by referring to commercial standards (e.g. VGA, 640×480).

Then, as one of the most important issues regarding this invention, the viewing direction of camera 1 must be determined in order to apply it to virtual camera 11 for synchronization. In particular, viewing direction can be calculated from the position of camera 1 relative to the position of marker object 5 i.e. at the instant at which camera 1 was used to capture the relevant image of marker object 5. In this regard, the viewing direction is the imaginary axis extending between the viewpoint and the eyepoint.

After determining the canvas size (or image pane) according to the above guidelines (in the first step of synchronizing the virtual camera to real camera 1), the virtual camera should be virtually positioned at the position of camera 1. When positioned as such, and thus synchronized, the position of camera 1 and camera 11 are aligned at identical coordinates in the same three-dimensional coordinate system (e.g. a coordinate system having values such as x, y, and z). It is noted that synchronizing coordinates implies the synchronization of different coordinate system (e.g. coordinates from the GPS are transformed to coordinates in the model-space). The position of marker point "MP" is then synchronized in the same manner.

Next, an additional step is necessary to synchronize the viewing direction of virtual camera 11. In this step, camera 11 should be aligned so that it is aimed along camera 1's viewing direction. Using the marker point "MP" as viewpoint (without correction) centers the marker point virtually in the middle of the image.

In order to determine the exact viewing direction, then, additional information about the orientation of camera 1 is used. This information is provided by the captured image and the location devices. Therefore, to determine the viewing direction relative to the marker point, the correct viewing direction is calculated using the deviation of the marker point detected in the image of the real scene according to the center of that image as deviation of the viewing direction of the real scene and the viewing direction as if camera 1 is directly aimed at the marker point "MP". The calculation is based on triangulation using the deviation in pixels in the captured image as well as the known (calculated and/or measured) distance between position of camera 1 and marker 5, and the field of view.

With this information, the orientation of the cameras in both scenes, real and virtual, is synchronized.

As a side note, it is recognized that it is important that the orientation or viewing direction of camera 1 be determined using marker objects (e.g. marker object 5). Although it is technically possible to use an alternative device or devices to calculate/determine camera 1's orientation/viewing direction, using marker objects provides the advantage of implicit error correction. Thus, using a marker object (in an image) to calculate camera orientation typically always results in usable data (even if errors were otherwise introduced). In other words, using marker objects is self-correcting, in effect, for certain types of measurement errors and is therefore the preferred mode of orientation/angle determination.

If the field of view of camera 1 is known (from knowledge of camera 1's optics, etc.), this value can be assigned to the virtual camera to achieve synchronization of canvas sizes (it is noted that field of view is typically more useful than focal length primarily because focal length is normally defined in relation to a specific image pane i.e. and image pane values are often not known). However, it is important to note that it is not mandatory that the optical system of camera 1 (and thus its field of view) be known and that alternative methods for determining field of view can be employed. If field of view is not known, then, the field of view (or virtual focal length of camera 1 according to canvas size) can be determined from the size of detected marker object 5 and the known (i.e. measured or calculated) distance between camera 1 and marker 5. This is particularly important when using a camera 1 which has a continuous zoom lens. In such a case, it is difficult to know what field of view is being employed for a particular degree of "zoom". Therefore, in such cases, field of view can be calculated from the detected size of detected marker object 5 (in the image of the real scene), the distance between the marker object and the camera, the known real size of the marker object, and the size of the image (i.e. the size of camera 1's canvas) via simple triangulation. However, if field of view is calculated from marker object values, it is helpful if a relatively large marker object is employed to reduce extrapolation errors (e.g. a marker object should be approximately $1/20^{th}$ of the size of the object being simulated).

Referring still to FIG. 5, after virtual object 10 has been rendered (i.e. on an intermediate virtual canvas in computer 9's memory), a final composite image (containing virtual object 10 overlayed in a real/natural scene image) can be composed. In this regard, once virtual object rendering has occurred, computer 9 simply merges the original image capture (i.e. the natural or real scene image) with the created digital image of virtual object 10. With proper synchronization and image combining, virtual object 10 will be displayed in the captured image at the appropriate scale, location, and orientation desired. FIGS. 2 and 5 illustrate these final steps which are performed by software resident on computer 9. Once the composite image is generated, the image can be stored on computer 9, displayed on a monitor (e.g. display device 17), saved to a separate storage device 15, or transmitted to a remote location (e.g. a television studio) via transmission device 19 (e.g. by satellite, radiowaves, etc.)(see FIG. 1 or 2).

In preferred embodiments, after virtual object 10 has been rendered (or during it's rendering), the appearance of the image of virtual object 10 can be edited (i.e. its appearance is tailorable to specific conditions). More specifically, data collected relating to the appearance of marker object 5 in live conditions can be employed to tailor the appearance of virtual object 10 as it will appear in the composite image.

For example, although some information about virtual object 10 is known prior to its rendering (e.g. shape, general color, etc.), data acquired during previous steps (relating to marker object 5's depth of color saturation, shading, brightness, etc. as detected in the captured image) may be employed to "fine tune" the virtual objects appearance so that it can be assimilated into a composite image as seamlessly as possible (e.g. for the greatest degree of realism or other desired factor). This tailorability can be performed automatically with computer 9 software (prior to, during, or after virtual object rendering), or manually as desired.

Once given the above disclosure, many other features, modifications, and improvements will become apparent to the skilled artisan. Such other features, modifications, and improvements are therefore considered to be part of this invention, the scope of which is to be determined by the following claims:

I claim:

1. A method of rendering a composite image including at least a virtual object displayed in a real scene image, said method comprising:
   providing a marker object having a position determining means;
   providing an image capturing means having a position determining means;
   determining size and shape qualities of said marker object;
   locating said marker object at a location at or near a location at which a virtual object is desired to be virtually placed;
   determining a position of said marker object;
   employing said image capturing means to capture at least one image of a real scene containing said marker object;
   determining a position of said image capturing means when said at least one image of a real scene is captured;
   analyzing said image of a real scene to detect said marker object;
   rendering a virtual object by synchronizing a virtual camera with said image capturing means, synthesizing a canvas having a size and shape corresponding to a size and shape of said image of a real scene, and projecting said virtual object onto said canvas so that said virtual object is displayed on said canvas at an orientation determined with reference to said position of said marker object in said image of a real scene; and
   composing a composite image comprising said image of a real scene and said virtual object.

2. A method according to claim 1 further comprising determining at least one reference value of said marker object relating to color, texture, or shading prior to said image capturing step;
   detecting a color, texture, or shading value of said marker object after said marker object is captured in said at least one image;
   comparing said detected value to said reference value; and
   rendering an appearance of said virtual object in said composite image in accordance with a difference between said detected value and said reference value thereby to tailor an appearance of said virtual object according to live conditions present at said location of said marker object at a time of capture of said at least one image.

3. A method according to claim 2 wherein said appearance of said virtual object is modified in color, color saturation, texture, or shading according to said difference between said detected value and said reference value.

4. A method according to claim 2 wherein said appearance of said virtual object is modified in real time.

5. A method according to claim 1 wherein said virtual object is three-dimensional.

6. A method according to claim 5 further comprising orienting said virtual object according to a relationship of said position of said image capturing means to said position of said marker object.

7. A method according to claim 6 further comprising determining a viewing direction of said image capturing means at a time of capture of said at least one image and virtually viewing said virtual object according to said viewing direction.

8. A method according to claim 6 wherein said image capturing means is capable of capturing moving images, and said marker object is portable and moveable during image capture; and wherein said virtual object is animatable in said composite image in a manner corresponding to movements of said marker object.

9. A method according to claim 6 wherein said virtual object is renderable in real time.

10. A method according to claim 9 wherein said virtual object is animatable in real time.

11. A method according to claim 6 wherein said virtual object is editable.

12. A method according to claim 2 further comprising determining aesthetic qualities of at least a second marker object;
locating said at least second marker object at or near at least a second location corresponding to a location at which at least a second virtual object is desired to be displayed;
determining a position of said at least second marker object;
differentiating said at least second marker object from said first marker object according to said aesthetic qualities; and
analyzing said image of a real scene to detect said at least second marker object, and detecting a scale of said at least second marker object in said image of a real scene;
rendering at least a second virtual object including sizing said at least second virtual object according to said scale of said at least second marker object, and virtually locating said at least second virtual object on a canvas at a position determined with reference to said position of said at least second marker object in said image of a real scene; and
composing a composite image comprising said image of a real scene and said at least second virtual object.

13. Apparatus for rendering a composite image including at least a virtual object displayed in a real scene image, said apparatus comprising:
a marker object having a position determining means, wherein said marker object is of known size and shape and located at known coordinates;
an image capturing means having a position determining means, wherein said image capturing means is located at known coordinates;
a computer having a computer readable medium, said computer being in communication with said image capturing means, said computer readable medium tangibly embodying a program of instructions executable by said computer to perform steps comprising:
detecting said marker object when displayed in an image captured by said image capturing means;
rendering a virtual object by synchronizing a virtual camera with said image capturing means, synthesizing a canvas having a size and shape corresponding to a size and shape of said image of a real scene, and projecting said virtual object onto said canvas so that said virtual object is displayed on said canvas at an orientation determined with reference to said position of said marker object in said image of a real scene; and
composing a composite image comprising a combination of said virtual object and a real scene image captured by said image capturing means.

14. Apparatus according to claim 13 wherein said steps further comprise:
detecting a color, texture, or shading value of said marker object after said marker object is captured in at least one image by said image capturing means;
comparing said detected value to a color, texture, or shading reference value of said marker object; and
rendering an appearance of said virtual object in said composite image in accordance with a difference between said detected value and said reference value thereby to tailor an appearance of said virtual object according to live conditions present at a location of said marker object at a time of capture of said at least one image.

15. Apparatus according to claim 14 wherein said steps further comprise modifying an appearance of said virtual object with regard to color, color saturation, texture, or shading according to said difference between said detected value and said reference value.

16. Apparatus according to claim 14 wherein said image capturing means is a video camera capable of capturing moving images and said marker object is portable.

17. Apparatus according to claim 14 wherein said marker object position determining means and said image capturing means position determining means are communicably connected to said computer.

18. Apparatus according to claim 14 further including viewing direction determining means for determining a viewing direction of said image capturing means at a time of capture of said at least one image and including means for orienting said virtual object according to said viewing direction.

19. Apparatus according to claim 17 wherein said marker object position determining means and said position determining means of said image capturing means comprise global positioning devices.

20. Apparatus according to claim 14 wherein said virtual object is three-dimensional and manually editable.

21. Apparatus according to claim 17 wherein said marker object position determining means comprises at least three objects having known positions, and wherein a position of said image capturing means is determinable by triangulation from said at least three objects.

22. A method according to claim 11 wherein said virtual object is editable on location.

23. A method according to claim 22 wherein said virtual object is editable on location and in real time.

* * * * *